(12) United States Patent
Sato

(10) Patent No.: US 8,302,647 B2
(45) Date of Patent: Nov. 6, 2012

(54) PNEUMATIC TIRE

(75) Inventor: Yoshiki Sato, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 667 days.

(21) Appl. No.: 12/400,964

(22) Filed: Mar. 10, 2009

(65) Prior Publication Data

US 2009/0266459 A1 Oct. 29, 2009

(30) Foreign Application Priority Data

Apr. 23, 2008 (JP) .................................. 2008-112619

(51) Int. Cl.
*B60C 11/12* (2006.01)
*B60C 11/03* (2006.01)

(52) U.S. Cl. ......... 152/209.25; 152/209.27; 152/209.15; 152/209.18

(58) Field of Classification Search ............... 152/209.1, 152/209.3, 209.9, 209.15, 209.18, 209.19, 152/209.25, 209.27

See application file for complete search history.

(56) References Cited

U.S. PATENT DOCUMENTS

| | | | | |
|---|---|---|---|---|
| 5,804,000 A | * | 9/1998 | Shirai et al. | 152/209.15 |
| 6,112,787 A | * | 9/2000 | Fukumoto et al. | 152/209.15 |
| 6,591,880 B1 | * | 7/2003 | Matsumoto et al. | 152/209.15 |

FOREIGN PATENT DOCUMENTS

| | | |
|---|---|---|
| CA | 2045383 | 1/1992 |
| JP | 04-349004 | 12/1992 |
| JP | 2001-121927 | 5/2001 |
| JP | 2006-082633 | 3/2006 |
| JP | 2007-050775 | 3/2007 |

* cited by examiner

Primary Examiner — Eric Hug
(74) Attorney, Agent, or Firm — Fish & Richardson P.C.

(57) ABSTRACT

An object of the present invention is to provide a pneumatic tire having low rolling resistance and higher resistance against irregular wear. To achieve the above object, a pneumatic tire includes a tread portion comprising a plurality of block arrays each of which is constituted of a plurality of blocks that are partitioned by a plurality of main grooves extending in a circumferential direction of the tire and a plurality of lateral grooves crossing the main grooves, wherein at least one of the block arrays is provided with a thin rib that continuously extends in the circumferential direction of the tire in a central area of the block array as viewed in a width direction of the tire and is partitioned by two sipes extending in the circumferential direction of the tire, the depth of the sipes extending in the circumferential direction of the tire is 0.7 times or less of the depth of the lateral grooves.

2 Claims, 2 Drawing Sheets

PNEUMATIC TIRE

BACKGROUND OF THE INVENTION

1. Field of the Invention

The present invention relates to a pneumatic tire, including a tread portion comprising a plurality of block arrays each of which is constituted of a plurality of blocks that are partitioned by a plurality of main grooves extending in a circumferential direction of the tire and a plurality of lateral grooves crossing the main grooves. The pneumatic tire has low rolling resistance and higher resistance against irregular wear.

2. Description of the Related Art

Generally, pneumatic tires have a tread portion formed with a plurality of block arrays, and traction performance is satisfactorily ensured. Such pneumatic tires are excellent in braking, turning and cornering characteristics. However, in such pneumatic tires, a large deformation is generated on the blocks during running, and as the hysteresis loss increases, rolling resistance tends to increase. Also, rigidity difference among the blocks tends to cause irregular wear such as stepped wear.

Japanese Unexamined Patent Publication (Kokai) No. 2006-82633 and Japanese Unexamined Patent Publication (Kokai) No. 4-349004 disclose a pneumatic tire, which has a tread portion including a block array located in a shoulder area thereof; and in one side in a width direction of the tire, a thin rib extends in a circumferential direction of the tire. However, such pneumatic tires disclosed in the documents have problems as described below. That is, the block array generates a rigidity difference between the thin rib side and the opposite side, and when the tire comes into contact with the ground, a larger slip is made on the block located at the opposite side. Irregular wear tends to be generated in such block array. Further, in the pneumatic tires disclosed in the documents, the thin rib is segmented by lateral grooves as viewed in the circumferential direction of the tire. Compared with the case in which a thin rib continuously extends in a circumferential direction of the tire is disposed in a block array, the block rigidity within the block array largely decreases. As a result, deformation amount of the block becomes larger, and as the hysteresis loss increases, the rolling resistance tends to increase in the block array.

Also, Japanese Unexamined Patent Publication (Kokai) No. 2007-50775 discloses a pneumatic tire with a thin rib extending in a circumferential direction of the tire in a central area of a block array as viewed in a width direction. In this pneumatic tire also, a thin rib is segmented by lateral grooves in a circumferential direction of the tire. Therefore, a rigidity difference tends to be generated between the respective blocks in a circumferential direction of the tire causing irregular wear in the block array. Furthermore, in the above pneumatic tire, since the thin rib is segmented as viewed in a circumferential direction of the tire, the rolling resistance tends to increase in the block array.

Further, Japanese Unexamined Patent Publication (Kokai) No. 2001-121927 discloses such a pneumatic tire that an array of one or more ribs is disposed in a tread portion thereof. In a central area of the rib array as viewed in a width direction of the tire, a thin rib, which continuously extends in the circumferential direction of the tire, is disposed to prevent the wear of the rib array. However, in such pneumatic tire, the thin rib is disposed in the rib array. Therefore, the pneumatic tire is not intended to solve the problem; i.e., to reduce the deformation amount of the block and to reduce the rigidity difference among the blocks.

SUMMARY OF THE INVENTION

The present invention has been made under these circumstances. The object of the present invention is to provide a pneumatic tire having low rolling resistance and higher resistance against irregular wear.

The above-mentioned object can be achieved by the present invention as follows. That is, the present invention provides a pneumatic tire, including a tread portion comprising a plurality of block arrays each of which is constituted of a plurality of blocks that are partitioned by a plurality of main grooves extending in a circumferential direction of the tire and a plurality of lateral grooves crossing the main grooves, wherein at least one of the block arrays is provided with a thin rib that continuously extends in the circumferential direction of the tire in a central area of the block array as viewed in a width direction of the tire and is partitioned by two sipes extending in the circumferential direction of the tire, the depth of the sipes extending in the circumferential direction of the tire is 0.7 times or less of the depth of the lateral grooves. The expression "thin rib continuously extending in a circumferential direction of the tire in a central area of block arrays as viewed in a width direction of the tire" as used herein means a thin rib that continuously extends in a circumferential direction of the tire, and the centerline thereof is located in a 30 to 70% area of the width of a block array with respect to a side end of the tire equator line as viewed in the width direction of the tire.

The pneumatic tire according to the present invention is arranged in such a way that, in at least one block array, a thin rib continuously extending in the circumferential direction of the tire is formed, so that the rigidity of the block array can be increased. As a result, deformation of the block and the hysteresis loss are reduced; and accordingly the rolling resistance can be reduced. Further, the thin rib continuously extending in the circumferential direction of the tire is disposed in a central area of the block array as viewed in the width direction of the tire. Therefore, when the tire comes into contact with the ground, slip of blocks can be uniformly reduced in the entire block array, and thus the rigidity difference among the blocks can be reduced. As a result, irregular wear can be prevented in the block array.

The thin rib continuously extending in the circumferential direction of the tire is partitioned by the two sipes extending in the circumferential direction of the tire. The rigidity difference is reduced between the thin rib and the blocks that abut on the thin rib being interposed by the sipes extending in the circumferential direction of the tire. As a result, the difference in rigidity is eliminated between the thin rib and the blocks in the block array. Accordingly, the entire block array can be prevented from being worn irregularly. Furthermore, since the sipes extending in the circumferential direction of the tire partition the thin rib, the rigidity of the thin rib is reduced so that the riding quality of the tire can be increased.

In the above tire, the edges of the thin rib are preferably chamfered. With this arrangement, the rigidity difference between the thin rib and the blocks that abut on the thin rib being interposed by the sipes extending in the circumferential direction of the tire is reduced. As a result, difference in rigidity is eliminated between the thin rib and the blocks in the block array. Thus, the entire block array can be effectively prevented from being worn irregularly.

DETAILED DESCRIPTION OF THE PREFERRED EMBODIMENTS

Figure 1:
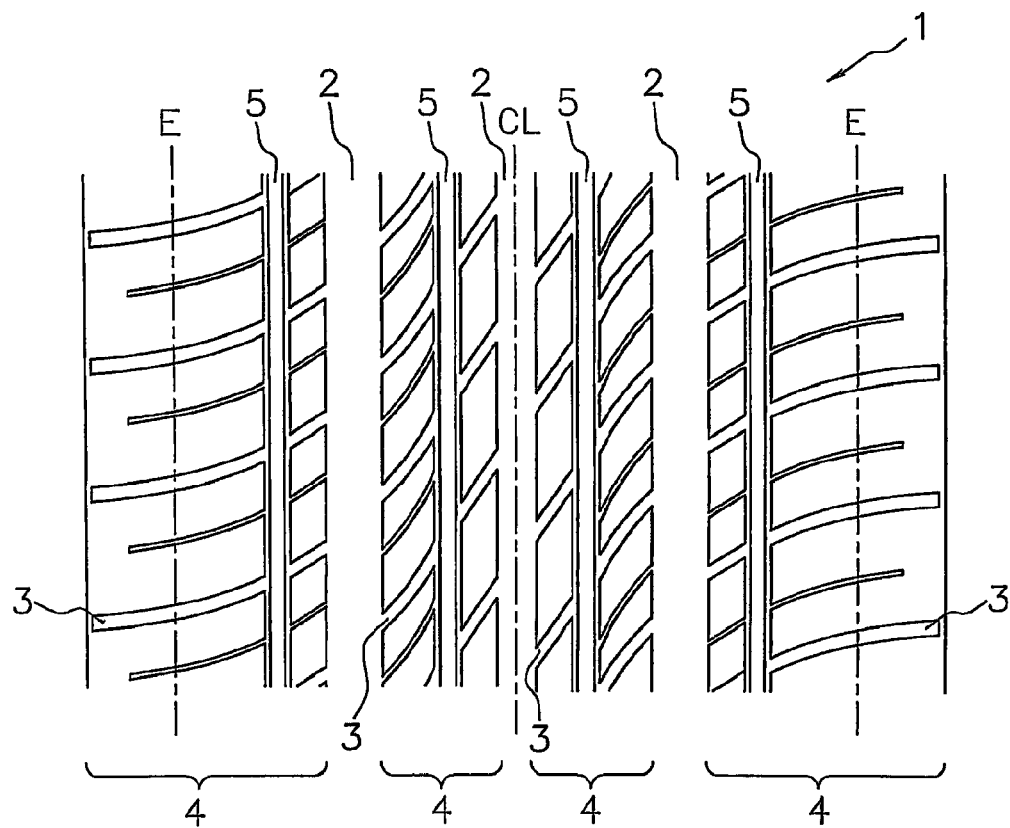
FIG. 1 is a development view illustrating an example of a tread pattern on a pneumatic tire according to the present invention.
Figure 2:
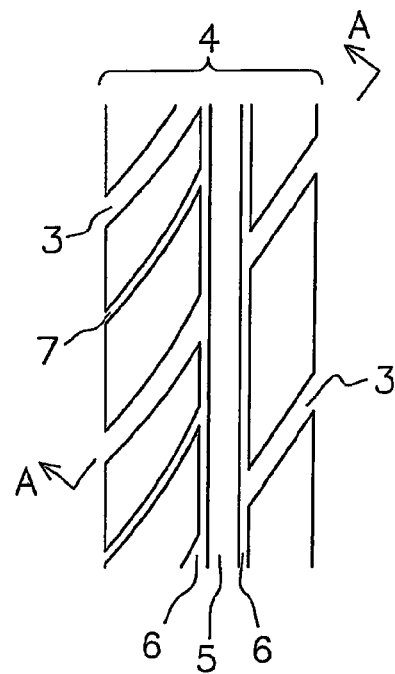
FIG. 2 is a partial enlarged view of FIG. 1.
Figure 3:
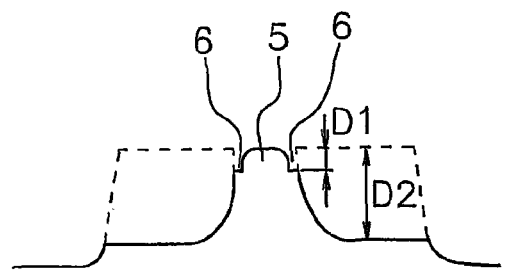
FIG. 3 is an example of a sectional view of FIG. 2 as viewed in a direction of arrows A-A.

Preferred embodiments of the present invention will be described below with reference to the drawings. FIG. 1 is a development view illustrating an example of a tread pattern on a pneumatic tire according to the present invention. FIG. 2 is a partial enlarged view of FIG. 1. FIG. 3 is an example of a sectional view of FIG. 2 as viewed in a direction of arrows A-A.

Although not shown in the figures, the pneumatic tire according to the present invention has a pair of bead portions, a pair of sidewall portions and a tread portion 1, a carcass of one ply or more and a belt. The carcass is bridged between the bead cores, which are embedded respectively within the bead portion to reinforce the respective portions. The belt has two or more steel cord layers covered with rubber located at the outer side of the carcass to enforce the tread portion 1.

In the pneumatic tire according to the present invention, the tread portion 1 has a plurality of block arrays 4 constituted of a plurality of blocks. Each of the plurality of blocks is partitioned by a plurality of main grooves 2 extending in the circumferential direction of the tire and a plurality of lateral grooves 3 crossing the main grooves 2 as shown in FIG. 1 and FIG. 2. Each of the blocks constituting the block array 4 may have a sipe 7 formed extending in a width direction of the tire as shown in FIG. 2. At least one of the block arrays 4 has a thin rib 5 continuously extending in a circumferential direction of the tire. The thin rib 5 is partitioned by two sipes 6 extending in the circumferential direction of the tire. By providing the thin rib 5 extending continuously in the circumferential direction as described above to the block array 4, the rigidity of the block array 4 can be increased. As a result, deformation amount of the blocks is reduced and the hysteresis loss is reduced; and thus the rolling resistance can be reduced.

In the present preferred embodiment, the width of the lateral groove 3 is, for example, 3.0 to 7.0 mm. The width of the main groove 2 extending in the circumferential direction of the tire is, for example, 5.0 to 15.0 mm; but is not particularly specified thereto. The depth of the lateral groove 3 is, for example, 5.0 mm to 10.0 mm. The depth of the main groove 2 extending in the circumferential direction of the tire is, for example, 5.0 to 10.0 mm. The two sipes 6 extending in the circumferential direction of the tire, which partition the thin rib 5, and the lateral groove 3, which partitions the block, are communicated with each other.

The centerline (not shown in FIGS.) of the thin rib 5 is disposed, as viewed in the width direction of the tire, in an area 30 to 70% of the width of the block array 4 with respect to the end of the block array 4 located at the equator line CL side as the reference. More preferably, the centerline of the thin rib 5 is positioned in a substantially central area (45 to 55%) of the width of the block array 4 as viewed in the width direction of the tire. By disposing the thin rib 5 with the centerline thereof located within such area in the block array 4, when the tire comes into contact with the ground, slip of the entire block array 4 can be reduced. Furthermore, the rigidity difference among the blocks can be reduced. As a result, irregular wear in the block array 4 can be prevented.

The width of the thin rib 5 is preferably 2.0 to 8.0 mm, more particularly 3.0 to 5.0 mm. When the width of the thin rib 5 is 2.0 mm or less, the rigidity of the thin rib 5 becomes too small, so that the rigidity of the block array 4 may not be ensured. In such a case, a larger deformation amount is generated in the block and the hysteresis loss is increased; accordingly, the rolling resistance tends to be increased. Contrarily, when the width of the thin rib 5 exceeds 8.0 mm, the rigidity of the thin rib 5 becomes too large, so that the riding quality may be reduced.

The edge portions of the thin rib 5 are preferably chamfered as shown in FIG. 3. With the arrangement of the thin rib 5 and the sipes 6 extending in the circumferential direction of the tire, the rigidity difference between the thin rib 5 and the blocks abutting thereon is reduced. As a result, a uniform rigidity can be obtained between the thin rib 5 and the blocks in the block array 4; and thus irregular wear in the block array 4 can be further prevented. In order to obtain more uniform rigidity between the thin rib 5 and the blocks, the edges of the thin rib 5 is preferably chamfered so as to have a curvature radius of ((width of the thin rib 5)/5) to ((width of the thin rib 5)/2) mm. When the curvature radius is less than ((width of the thin rib 5)/5) mm, the rigidity difference between the thin rib 5 and the blocks becomes larger thereby reducing the preventive effect of the irregular wear in the block array 4.

In the pneumatic tire according to the present invention, the thin rib 5 continuously extending in the circumferential direction of the tire is partitioned by two sipes 6 extending in the circumferential direction of the tire. The rigidity difference is reduced between the thin rib 5 and the blocks abutting thereon being interposed by the sipes 6 extending in the circumferential direction of the tire. As a result, a uniform rigidity is obtained between the thin rib 5 and the blocks in the block array 4; and thus irregular wear in the block array 4 can be prevented. Further, since the thin rib 5 is partitioned by the sipes 6 extending in the circumferential direction of the tire, the rigidity of the thin rib 5 is reduced; and thus the riding quality of the tire can be increased.

The width of the sipes 6 extending in the circumferential direction of the tire is preferably 0.3 to 2.0 mm, more preferably 0.5 to 1.5 mm. When the width of the sipes 6 is less than 0.3 mm, the sipes are hardly formed. When the width of the sipes 6 exceeds 2.0 mm, the rigidity of the blocks in the block array 4 tends to be reduced.

As shown in FIG. 3, the depth D1 of the sipes 6 extending in the circumferential direction of the tire is 0.7 times or less of the depth D2 of the lateral groove 3. When the depth D1 of the sipes 6 exceeds 0.7 times of the depth D2 of the lateral groove 3, the rigidity in the block array 4 decreases, and the blocks deform largely resulting in larger rolling resistance. When considering the rolling resistance, the depth D1 of the sipes 6 extending in the circumferential direction of the tire is preferably 0.5 times or less of the depth D2 of the lateral groove 3; particularly, 3.0 mm or less. The depth D1 of the sipes 6 is preferably 1.0 mm or more, more preferably 1.5 mm or more. When the depth D1 of the sipes 6 is 1.0 mm or less, the rigidity difference becomes larger between the thin rib 5 and the blocks abutting thereon being interposed by the sipes 6. As a result, the irregular wear may not be prevented in the block array 4.

FIG. 1 and FIG. 2 show an example of the tread portion 1 according to the embodiment of the present invention. The tread portion 1 comprises four block arrays 4 partitioned by three main grooves 2 extending in the circumferential direction of the tire. Each of block arrays 4 has a thin rib 5, which is disposed in the central area as viewed in the width direction of the tire, and continuously extends in the circumferential direction of the tire being partitioned by two sipes 6 extending in the circumferential direction of the tire. In the present invention, the tread portion 1 has to have the thin rib 5 in at least one block array 4. In the tread portion 1, it is preferred to dispose the thin rib 5 in a central area of the block array 4 as viewed in the width direction of the tire, which is located in a portion where is largely deformed when the tire comes into contact with the ground. Particularly, in the case of a pneumatic tire with aspect ratio 55 or less, the thin rib 5 is preferably disposed in a central area of the block array 4, which is located in a shoulder area of the tread portion 1 as viewed in the width direction of the tire. In the case of a pneumatic tire with aspect ratio 60 or more, the thin rib 5 is preferably formed in a central area of the block array 4, which is located in a center area of the tread portion 1 as viewed in the width direction of the tire. Here, the wording "shoulder area" of the tread portion 1 indicates an area outer side than the main groove 2 extending in the circumferential direction of the tire, which is located at the outermost side as viewed in the width direction of the tire. Also, the wording "center area" of the tread portion 1 indicates an area located at the inner side of the main groove 2 extending in the circumferential direction of the tire, which is located at the outermost side as viewed in the width direction of the tire.

Each of the block arrays 4 located in the shoulder areas of the tread portion 1 may include a portion extending outward over a contact end E in the width direction of the tire as shown in FIG. 1. In the above block array 4, the "width of the block array 4" means a distance from the end located at the equator line CL side to the contact end E.

The pneumatic tire of the present invention is the same as ordinary pneumatic tires except the above-described tread portion. Therefore, any of conventionally known material, shape, structure, manufacturing method and the like may be applied to the present invention.

Other Embodiments

Other embodiments of the present invention will now be described.

Figure 4:
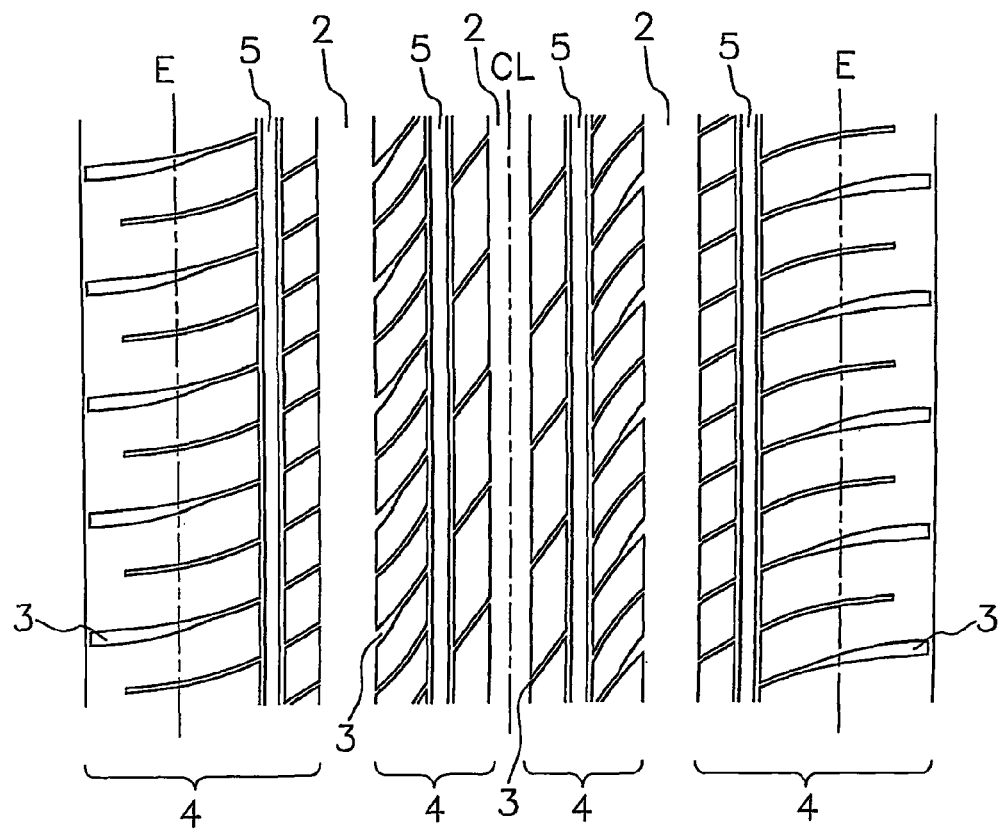
FIG. 4 is a development view illustrating the other example of a tread pattern on a pneumatic tire according to the present invention.

In the above-described embodiments, an example in which the width of the lateral groove 3 is 3.0 to 7.0 mm is given. The width of the lateral groove 3 may be set to be narrower as 0.5 to 3.0 mm as shown in FIG. 4. By setting the width of the lateral groove 3 within such a range, the deformation amount of the blocks can be reduced, and thus the hysteresis loss can be reduced; thereby the rolling resistance can be further reduced.

Examples

Example that particularly demonstrates the arrangements and effects of the present invention will be described below. The performances of the tire were evaluated as described below.

(1) Rolling Resistance

Using a test tire (tire size: 225/45R17 8J), rolling resistance was measured while carrying out on-drum drive test to evaluate the same. Defining the value of Conventional Example 1 as 100, the evaluation result is expressed using an index. A larger index indicates lower rolling resistance; i.e., more preferable. The running conditions were: drum diameter: 1,708 mm, camber angle: 0°, air pressure: 230 kPa, speed: 80 km/h, and load: 500 N.

(2) Irregular Wear Resistance

A test tire (tire size: 225/45R17 8J) was mounted to an actual vehicle (class 2.5 L, sedan for Japanese market, two passengers on the vehicle). After running 10000 km on a normal road surface, depth of the remaining groove was measured. Defining the depth of the groove of Conventional Example 1 as 100, evaluation was made using index. A larger index indicates more excellent performance in irregular wear resistance.

Example 1

The following pneumatic tire was prepared. That is, in the tread portion 1 as shown in FIG. 1, the width of the thin rib 5: 4 mm; curvature radius of chamfered edges of the thin rib 5: 1.5 mm; location of thin rib 5: center line of block array 4 was located in a 50% area of width of the block array 4 with respect to the end at tire equator line CL side as viewed in a width direction of the tire; the depth of the sipes 6 extending in the circumferential direction of the tire: 2 mm; the width the sipes: 1 mm; depth of the lateral groove 3: 7 mm; and width of the lateral groove 3: 3 mm. Using this tire, the above-described performance tests were carried out. The results are shown in Table 1.

Conventional Example 1 and Comparative Example 1

As Conventional Example 1, the following pneumatic tire was prepared. The tire was the same as the tire of Example 1 except a point that block arrays composed of simple blocks only, but the thin ribs and the sipes extending in the circumferential direction in Example 1 were not formed in the block arrays. Also, a pneumatic tire as Comparative Example 1 was prepared in the manner as Example 1 excepting the following points. That is, unlike Example 1, thin rib was segmented by the lateral grooves and was not continuous in a circumferential direction of the tire; the edge portions of the thin rib 5 were not chamfered; and the thin rib was disposed so that the centerline thereof as viewed in the width direction was located in a 10% area of the width of the block array with respect to the end at the tire equator line side in the block arrays. Using these tires, the above-described performance tests were conducted. The results are shown in Table 1.

TABLE 1

|  | Conventional Example 1 | Comparative Example 1 | Example 1 |
| --- | --- | --- | --- |
| Rolling resistance | 100 | 103 | 108 |
| Irregular Wear Resistance | 100 | 102 | 106 |

It is found that, compared to the pneumatic tire of Conventional Example 1, in which the thin rib and the sipes extending in the circumferential direction were not formed but block arrays consisted of blocks only were made, the rolling resistance was reduced and the irregular wear resistance performance was increased in the pneumatic tires of Comparative Example 1 and Example 1. However, in the pneumatic tire of the Comparative Example 1, since the thin rib was not continuous in the circumferential direction of the tire, the thin rib was not disposed in the center of the block arrays, or the edges of the thin rib were not chamfered, the rolling resistance was high, and the irregular wear resistance performance was inferior to that of the pneumatic tire of Example 1.

What is claimed is:

1. A pneumatic tire, including a tread portion comprising a plurality of block arrays each of which is constituted of a plurality of blocks that are partitioned by a plurality of main grooves extending in a circumferential direction of the tire and a plurality of lateral grooves crossing the main grooves, wherein at least one of the block arrays is provided with a thin rib that continuously extends in the circumferential direction of the tire in a central area of the block array as viewed in a width direction of the tire and is partitioned by two sipes extending in the circumferential direction of the tire, each of the two sipes being in communication with lateral grooves, and the depth of the sipes extending in the circumferential direction of the tire is 0.7 times or less of the depth of the lateral grooves.

2. The pneumatic tire according to claim 1, wherein the edges of the thin rib are chamfered.

* * * * *